(12) United States Patent
Worrall et al.

(10) Patent No.: US 8,396,472 B2
(45) Date of Patent: Mar. 12, 2013

(54) PROVIDING MULTIPLE DATA STREAMS BY DIFFERENT NETWORKS FOR THE SAME CONTENT

(75) Inventors: Chandrika K. Worrall, Newbury (GB);
Haris Zisimopoulos, Reading (GB);
Alan Edward Jones, Wiltshire (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 1005 days.

(21) Appl. No.: 11/502,928

(22) Filed: Aug. 11, 2006

(65) Prior Publication Data

US 2008/0039057 A1  Feb. 14, 2008

(51) Int. Cl.
*H04W 4/00* (2009.01)
(52) U.S. Cl. .................. 455/434; 455/435.1; 455/435.2; 455/46; 370/338; 370/401
(58) Field of Classification Search .................. 455/434, 455/435.1, 435.2, 466; 370/338, 401; 709/231; 725/94

See application file for complete search history.

(56) References Cited

U.S. PATENT DOCUMENTS

| 5,737,703 | A | 4/1998 | Byrne |
| 6,320,852 | B1 | 11/2001 | Obuchi et al. |
| 7,813,311 | B2 | 10/2010 | Dick et al. |
| 2003/0235175 | A1* | 12/2003 | Naghian et al. ............... 370/338 |
| 2004/0081249 | A1* | 4/2004 | Tiedemann et al. .......... 375/260 |
| 2004/0147262 | A1* | 7/2004 | Lescuyer et al. ............. 455/434 |

FOREIGN PATENT DOCUMENTS

| JP | 08-237748 | 9/1996 |
| JP | 10247873 | 9/1998 |
| JP | 2005517340 | 6/2005 |
| WO | WO2004064270 | 7/2004 |
| WO | WO2005022814 | 3/2005 |

OTHER PUBLICATIONS

"3rd Generation Partnership Project; Technical Specification Group Services and System Aspects; Multimedia Broadcast/Multicast Service (MBMS) user services; Stage 1 (Release 6)," (Mar. 2006). 3GPP:Valbonne, France, TS 22.246 v6.3.0:1-16.

"3rd Generation Partnership Project; Technical Specification Group Services and System Aspects; Multimedia Broadcast/Multicast Service (MBMS); Protocols and codecs (Release 6)," (Jun. 2006). 3GPP:Valbonne, France, TS 26.346 v6.5.0:1-120.

"3rd Generation Partnership Project; Technical Specification Group Core Networks; Multimedia Broadcast/Multicast Service (MBMS); CN1 Procedure description (Release 6)," (Sep. 2004). 3GPP:Valbonne, France, TS 29.846 v6.0.0:1-33.

"3rd Generation Partnership Project; Technical Specification Group Services and System Aspects; 3G Security; Security of Multimedia Broadcast/Multicast Service (Release 6)," (Jun. 2006). 3GPP:Valbonne, France, TS 33.246 v6.7.0:1-58.

(Continued)

*Primary Examiner* — Kamran Afshar
*Assistant Examiner* — Manpreet Matharu
(74) *Attorney, Agent, or Firm* — Volpe and Koenig, P.C.

(57) ABSTRACT

Providing multiple data streams by different networks for the same content is disclosed. First and second data streams over respective first and second networks are provided. The first and second data streams carry the same content and are delivered using different radio access technologies (RATs) by the first and second networks. The data streams may be provided such that they are synchronized and received by a user equipment simultaneously.

34 Claims, 8 Drawing Sheets

OTHER PUBLICATIONS

"3rd Generation Partnership Project; Technical Specification Group Radio Access Network; Introduction to the Multimedia Broadcast Multicast Service (MBMS) in Radio Access Network (RAN); Stage 2 (Release 6)," (Jun. 2006). 3GPP:Valbonne, France, TS 25.346 v6.8.0:1-59.

"3rd Generation Partnership Project; Technical Specification Group Services and System Aspects; Telecommunication management; Charging management; Charging architecture and principles (Release 6)," (Sep. 2005). 3GPP:Valbonne, France, TS 32.240 v6.3.0:1-39.

"3rd Generation Partnership Project; Technical Specification Group Core Network and Terminals; Mobile radio interface Layer 3 specification; Core network protocols; Stage 3 (Release 6)," (Jun. 2006). 3GPP:Valbonne, France, TS 24.008 v6.13.0:1-526.

"3rd Generation Partnership Project; Technical Specification Group Core Network and Terminals; General Packet Radio Service (GPRS); GPRS Tunneling Protocol (GTP) across the Gn and Gp interface (Release 6)," (Jun. 2006). 3GPP:Valbonne, France, TS 29.060 v6.13.0:1-146.

"3rd Generation Partnership Project; Technical Specification Group Radio Access Network; Radio Resource Control (RRC); Protocol Specification (Release 6)," (Jun. 2006). 3GPP:Valbonne, France, TS 25.331 v6.10.0:1-1226.

Deering, S. et al. (Oct. 1999). "Multicast Listener Discovery (MLD) for IPv6," Network Working Group, located at <http://www.ietf.org/rfc/rfc2710.txt> visited on Jun. 21, 2007. (20 pages).

Fenner, W. (Nov. 1997). "Internet Group Management Protocol, Version 2," Network Working Group, located at <http://www.ietf.org/rfc/rfc2236.txt> visited on Jun. 21, 2007. (22 pages).

Chinese Patent Application No. 200780034530.6; Office Action with Translation dated Apr. 26, 2011.

Japanese Patent Application No. 2009-523291; Translation of Office Action dated Jul. 8, 2011.

Single, R., MRA Architecture; Mobile and Wireless Systems Beyond 3G, Feb. 17, 2005, pp. 1-69.

Office Action for Japanese Application No. 2011-093137 issued Mar. 13, 2012.

Sigle R., MRA Architecture, Mobile and Wireless Systems Beyond 3G, pp. 1-69 (Feb. 17, 2005).

International Search Report, PCT Application No. PCT/EP2007/058242, mailed on Jan. 3, 2008.

Office Action, Korean Patent Application No. 10-2009-7004518, dated Oct. 25, 2010.

* cited by examiner

PROVIDING MULTIPLE DATA STREAMS BY DIFFERENT NETWORKS FOR THE SAME CONTENT

BACKGROUND OF THE INVENTION

Mobile operators worldwide have launched streaming real-time services (such as mobile TV and radio) over their existing 3G Universal Mobile Telecommunications System ("UMTS") networks. However, the existing UMTS air-interface and overall network architecture are not adequate to deliver high quality, bandwidth-demanding multimedia content, such as television for a large number of users. Consequently, the 3GPP standards consortium has introduced the Multimedia Broadcasting/Multicasting Service ("MBMS") framework. The MBMS framework identifies optimizations in the UMTS Radio Access Network ("UTRAN") and the core network system architecture to enable deployment of multicast/broadcast multimedia applications over the UMTS air-interface and core network.

Because MBMS is intended to serve a large user population, the usage of radio resources must be managed efficiently to avoid system overload due to MBMS services that could degrade the quality of the other services. In conventional MBMS/multimedia streaming, the multimedia traffic is delivered over a single radio access network at a given time. Thus, the delivery is optimized for over-the-air signal combining, where such combining occurs at the lower protocol layers. This configuration still leaves much to be desired in the way of reliability and resolution of multimedia content seen and heard at the user equipment. It would thus be advantageous to improve the perceptual quality of multimedia services delivered over wireless networks.

BRIEF SUMMARY OF THE INVENTION

The likelihood of an overload traffic condition for multimedia services can be reduced by delivering the multimedia traffic over a separate frequency band from that used for other services. One way of achieving this is to use an overlay network for the delivery of multimedia services. The overlay network may be deployed in areas of high user concentration and service demand (e.g., hotspots). Such an overlay network may be optimized for the support of multimedia service to a large user population. However, in order to disperse the service availability over large geographical areas, the service may also be provided over the widespread network upon which it is overlaid. This large-scale network may be optimized for a small number of users. Thus, the two networks may use different transmission modes for provision of the same multimedia content.

Embodiments of the present invention provide methods and apparatus for provisioning multimedia services, where the service is provided over multiple Radio Access Technologies ("RATs"). In addition, embodiments of the invention employ different transmission modes (i.e., delivery modes), which are independent of each other. Examples of such modes are "multicast MBMS bearer" and "unicast streaming bearer." A user who has activated the service may receive the service over more than one radio access network with the use of independent delivery modes. The different delivery modes limit over-the-air combining of the signals, and avoid signal combining at the protocol layers defined by the radio access networks. Instead, the application layer at the user equipment ("UE") uses smart application procedures to exploit the transmission diversity in combining the multiple data streams, thereby achieving high perceptual multimedia quality.

In particular, a service center for provisioning a service, such as a multimedia service, over different networks may include apparatus for establishing transmission of first and second data streams in respective first and second transmission modes over respective first and second networks. The first and second data streams may carry the same content, and the first and second networks may employ respective first and second radio access technologies. The service center may also include apparatus for synchronizing the transmission of the two data streams over the first and second networks, and apparatus for signaling to user equipment identifiers for the two networks over which the two data streams are established.

On the receiver side, user equipment may receive content in first and second data streams in respective first and second transmission modes over respective first and second networks. The first and second data streams may carry the same content, and the first and second networks may respectively employ first and second radio access technologies. The user equipment may include apparatus for combining the first and second data streams at the application layer into a combined data stream, and a decoder for decoding the combined data stream into an output for presentation to a user. The apparatus for combining may dynamically select a data unit from the first data stream for combining into the combined data stream based at least in part upon the relative signal reliability of the first data stream compared to the second data stream.

DETAILED DESCRIPTION OF THE INVENTION

Figure 1:
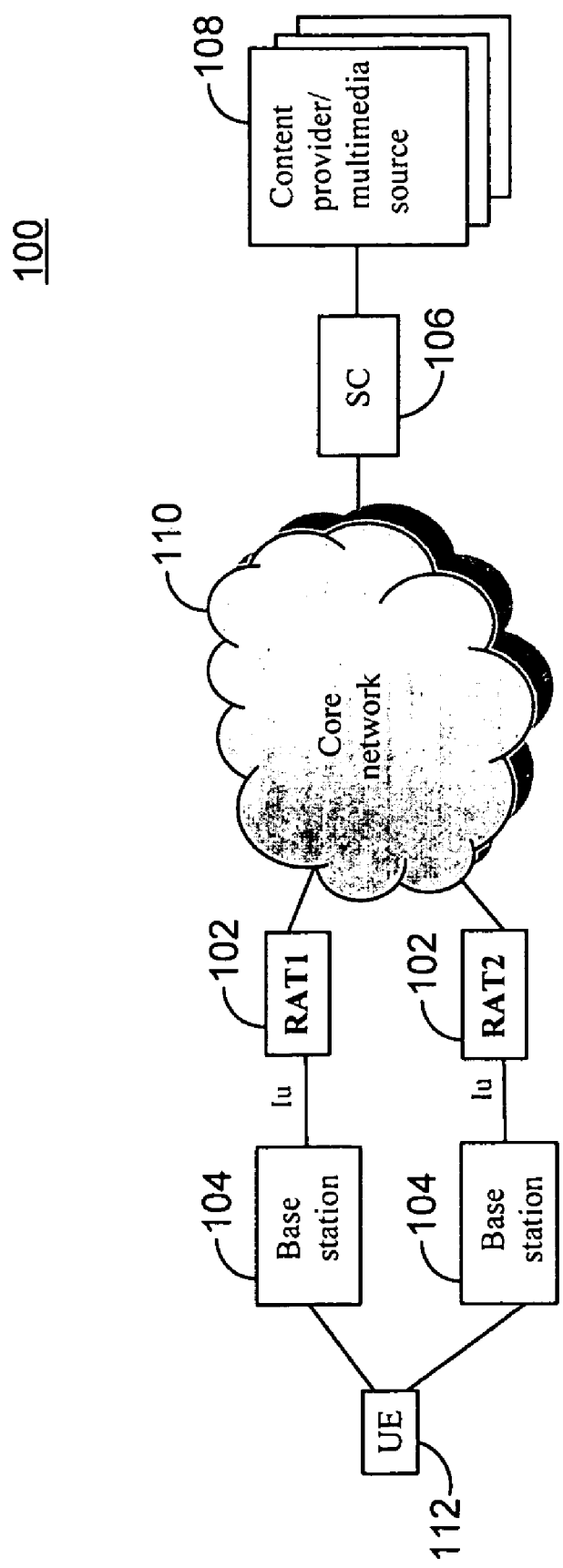
FIG. 1 illustrates a network infrastructure according to embodiments of the invention.

FIG. 1 illustrates an example of an overlay network architecture 100 including two RATs 102, RAT1 and RAT2. Each RAT includes at least one radio controller in a corresponding radio access network for controlling at least one base station 104. Each radio controller handles radio resource and mobility management. A Service Center (SC) 106 is connected to a plurality of content provider/multimedia sources 108. The SC provides multimedia content to the core network 110, and then to User Equipment 112 over RAT1 and RAT2 at the same time.

In embodiments of the invention, the receiving device (the UE) includes dual receiver capability, and is able to receive traffic simultaneously in two RATs. The service center may be shared by the radio access networks. Thus, the same multimedia content may be delivered over the plurality of networks represented by the RATs 102. The SC 106 synchronizes the multimedia data streams, and signals to the UE 112 the identity of the RATs 102 over which the particular data stream is transmitted, using the service description/advertisement message format known in UMTS.

Figure 2:
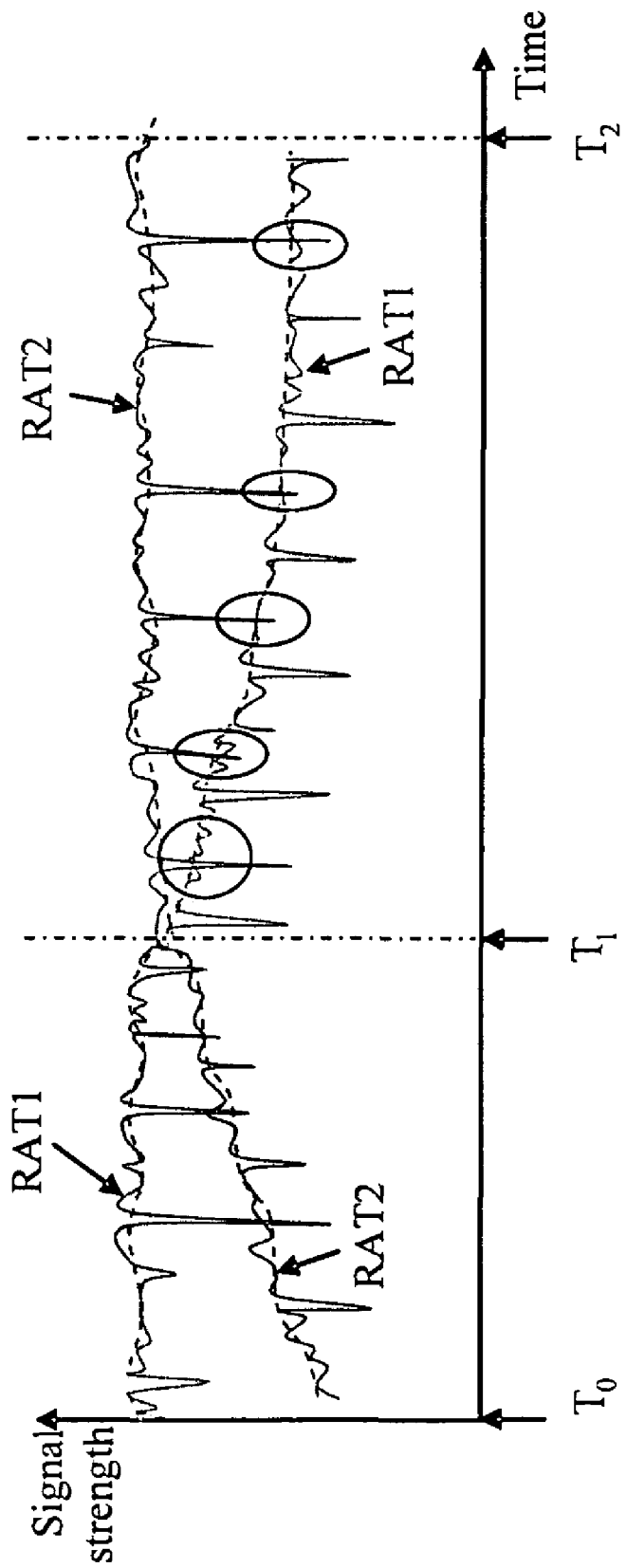
FIG. 2 illustrates signal reception from multiple RATs according to embodiments of the invention.

FIG. 2 illustrates the signal strength received over RAT1 and RAT2 for period of time ($T_0$ to $T_2$). The signal strength fluctuates due to fast and slow fading experienced in wireless channels. The slow fading component of each signal is shown in dashed line. At time T1, the signal over RAT2 becomes stronger than the signal over RAT1. However, due to the fast fading, the signal over RAT2 may be weaker than that of RAT1 at some instances (which are circled in the figure). Note that T1 may indicate the time instance when the UE reaches the edge of the coverage area of RAT1.

The content is transmitted over two independent radio access networks which may use different air interface technologies and different delivery mechanisms. Thus, possibly distinct protocol stacks will exist on the terminal controlling the different modes, in which case signal combining at a lower protocol layer (RAT-specific protocol stack) at the receiving device is impossible. Consequently, according to embodiments of the present invention, the data streams received over different radio access networks are delivered to the application layer at the receiving device.

Figure 3:
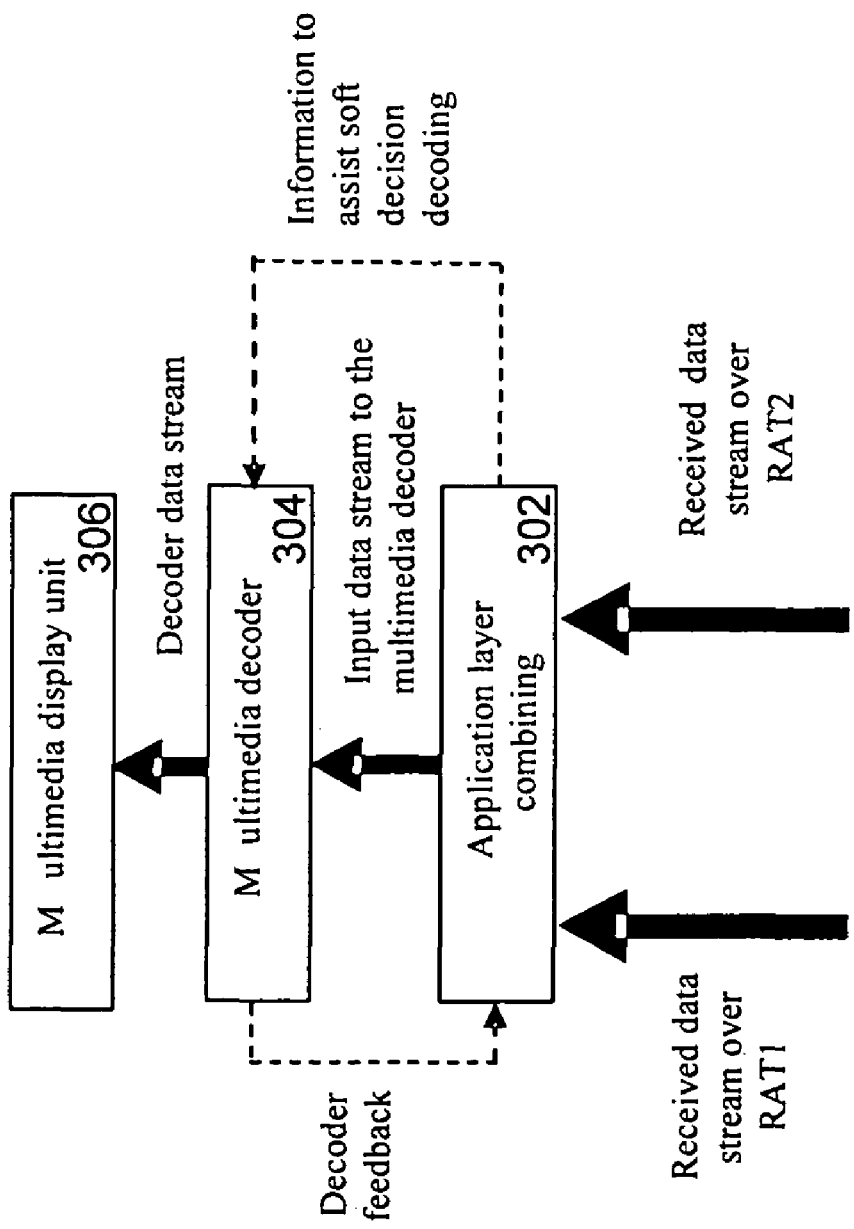
FIG. 3 illustrates application-layer combining according to embodiments of the invention.

As illustrated in FIG. 3, the UE includes a smart application procedure 302 at the application layer that combines the plurality of data streams received over different radio access networks prior to decoding of the multimedia stream. The stream combining produces an input data stream to a decoder 304, which provides the decoded stream to a display unit 306. If soft decision decoding is employed at the multimedia decoder, the decoder extracts additional information from the received multiple data streams (inserted by the SC) to assist in soft decision decoding. The UE 112 also time-synchronizes the data streams received over the separate RATs prior to combining at the application layer.

Figure 4:
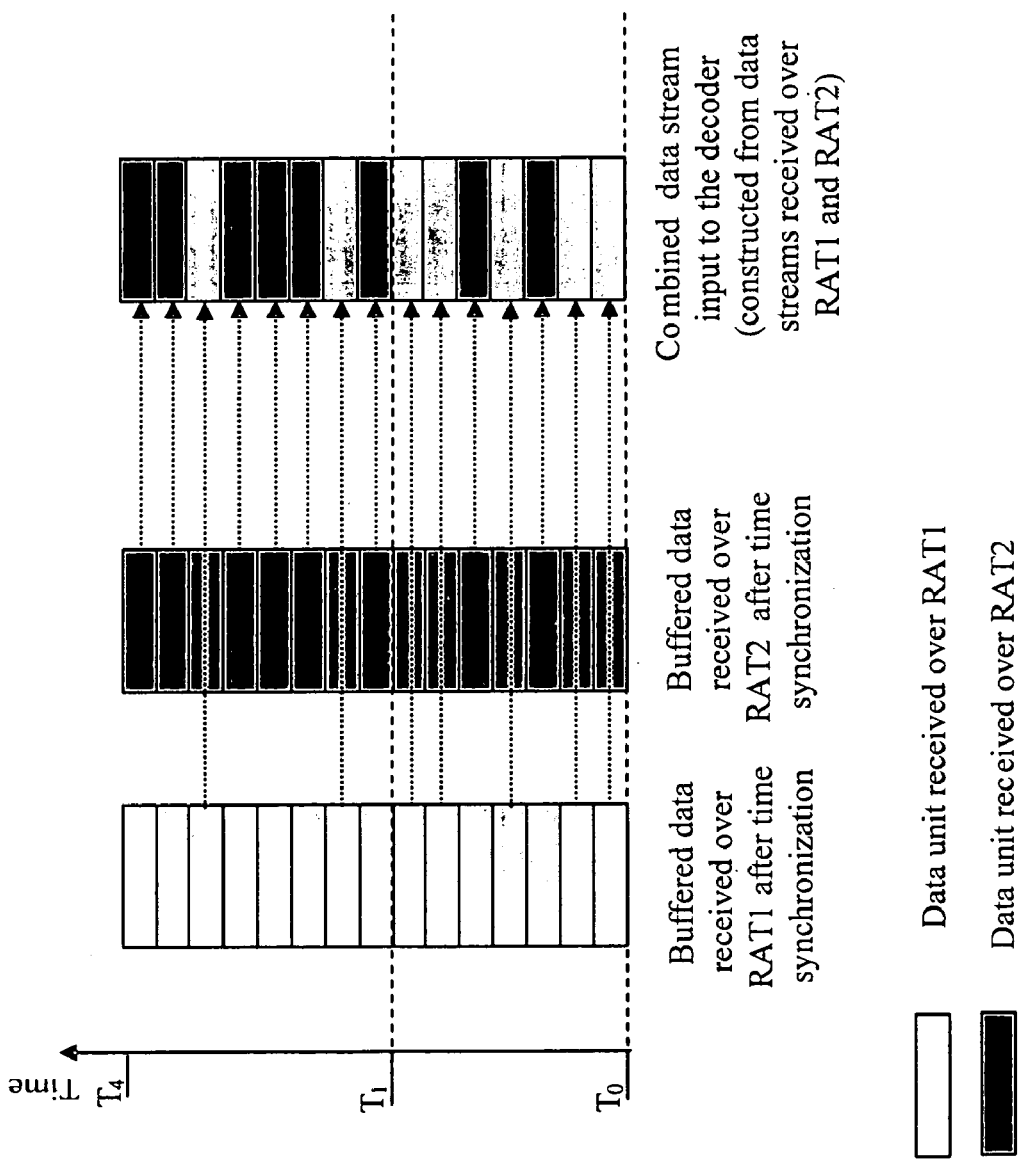
FIG. 4 illustrates stream combining according to embodiments of the invention.

FIG. 4 illustrates the stream combining procedure implemented at the UE application layer. Data units are selected from the time-synchronized data streams to construct an input data stream to the multimedia decoder. A "data unit" refers to any application layer grouping of bits, such as, for example, a data bit, a data block consisting of a (fixed or variable) number of bits, a transport data block (datagram), an application layer packet, or any other application layer bit grouping, such as, for example, a video frame, video packet, or macro-block.

Figure 5:
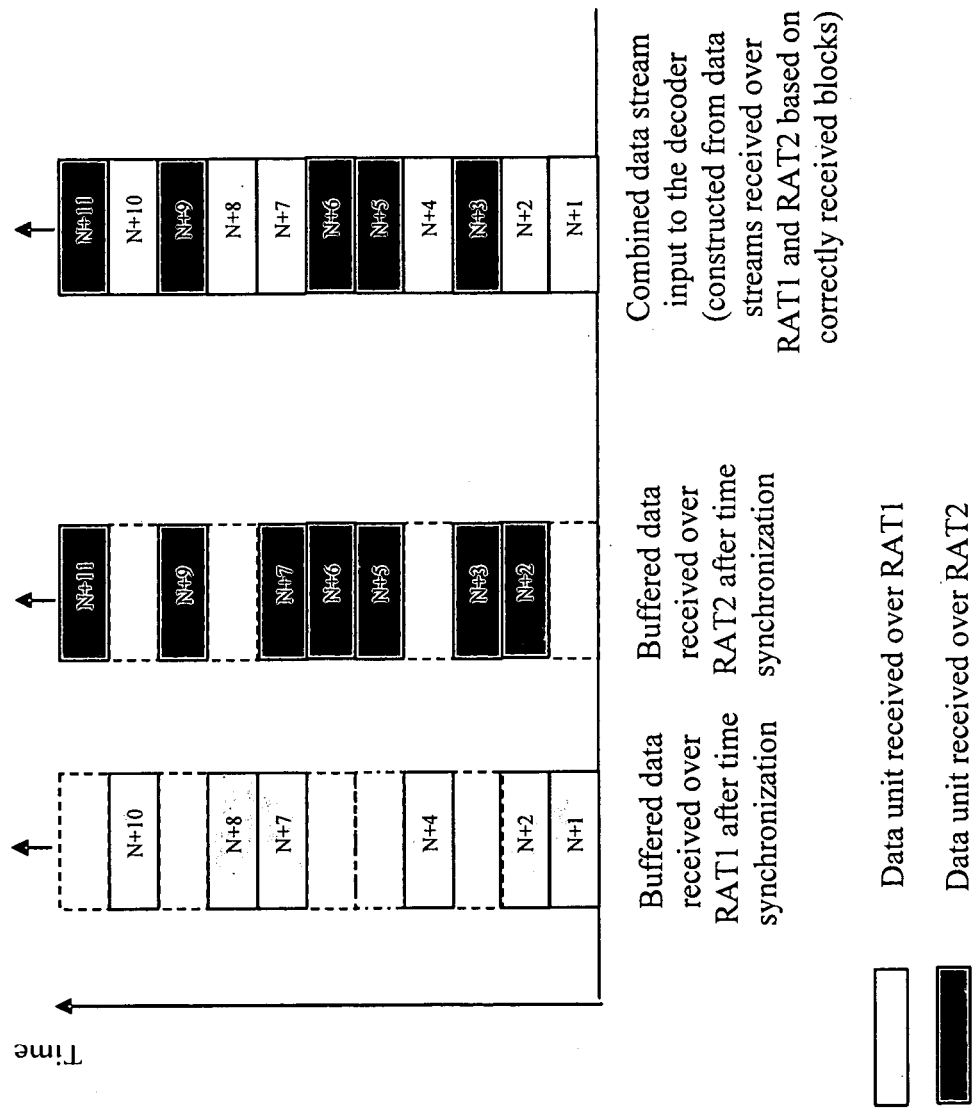
FIG. 5 further illustrates stream combining according to embodiments of the invention.

The data units are selected from different data streams to achieve high perceptual quality of the media after decoding. The selection criterion may be based on, for example, the number of correctly received bits in each stream, the number of correctly received blocks, bit error rate, block error rate, or relative importance of the multimedia data in achieving high perceptual quality or decoder feedback, as measured over a moving time window, according to methods know in the prior of art. FIG. 5 illustrates a correctly received block based on the selection criterion.

Figure 6:
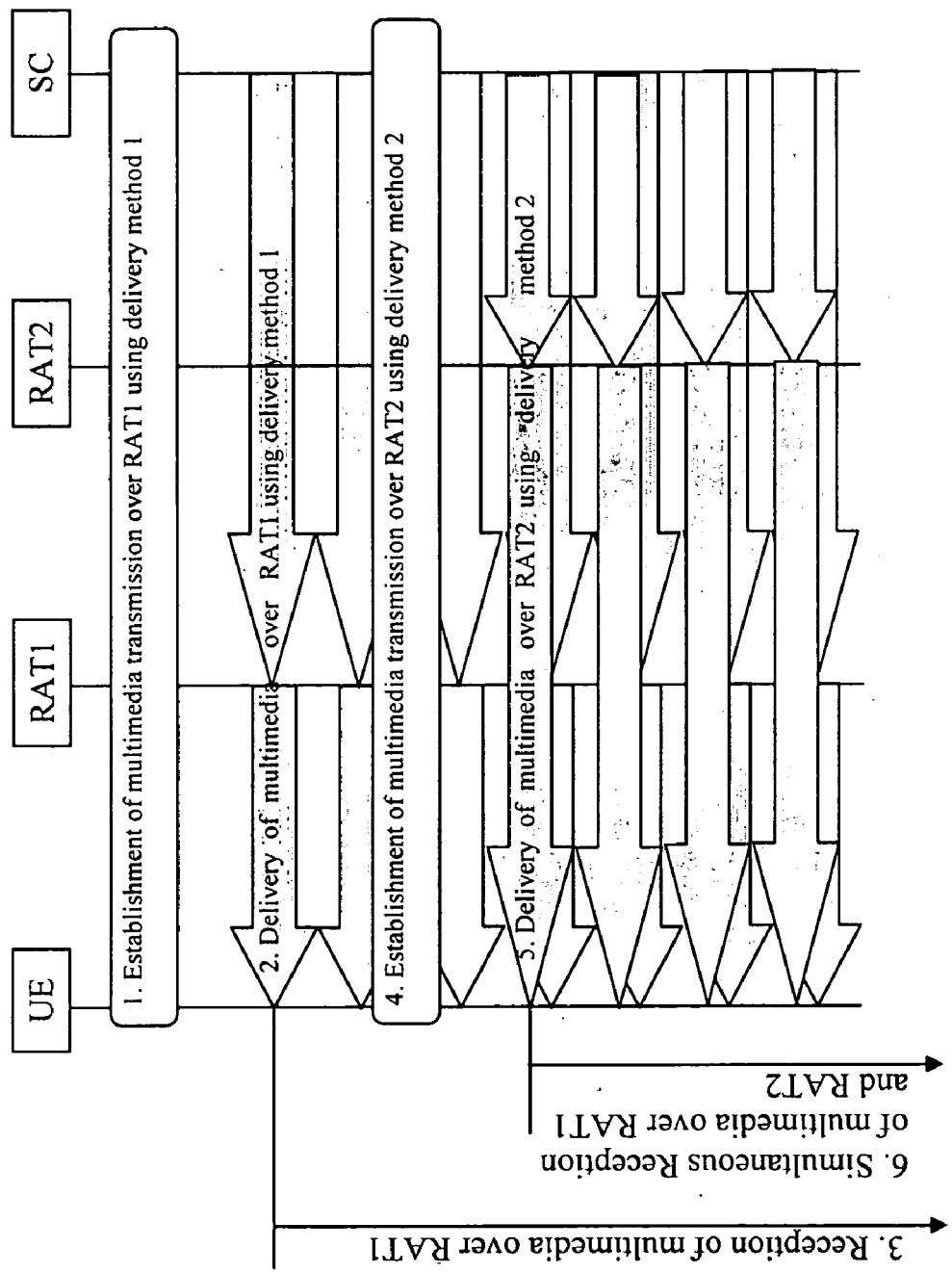
FIG. 6 illustrates signaling flow according to embodiments of the invention.

FIG. 6 illustrates the signaling flow involved in provision of multimedia according to embodiments of the present invention. Some of the essentials within each step for establishing communication will be recognized by those skilled in the art.

Step 1: The necessary signaling between the SC, the radio controller in RAT1, and the destination UE (through a base station in the radio access network of RAT1) for the establishment of the radio bearer for multimedia delivery over RAT1, which uses delivery method 1. Delivery methods include, for example, unicast or point-to-multipoint.

Step 2: The SC starts delivering the multimedia service over RAT1 using delivery method 1.

Step 3: The UE receives the service over RAT1 using method 1.

Step 4: The necessary signaling for the establishment of a radio bearer for multimedia delivery over RAT2 which uses delivery method 2.

Step 5: The SC starts delivering the service over RAT2, which uses delivery method 2.

Step 6: The UE receives the service over RAT1 and RAT2 simultaneously.

Figure 7:
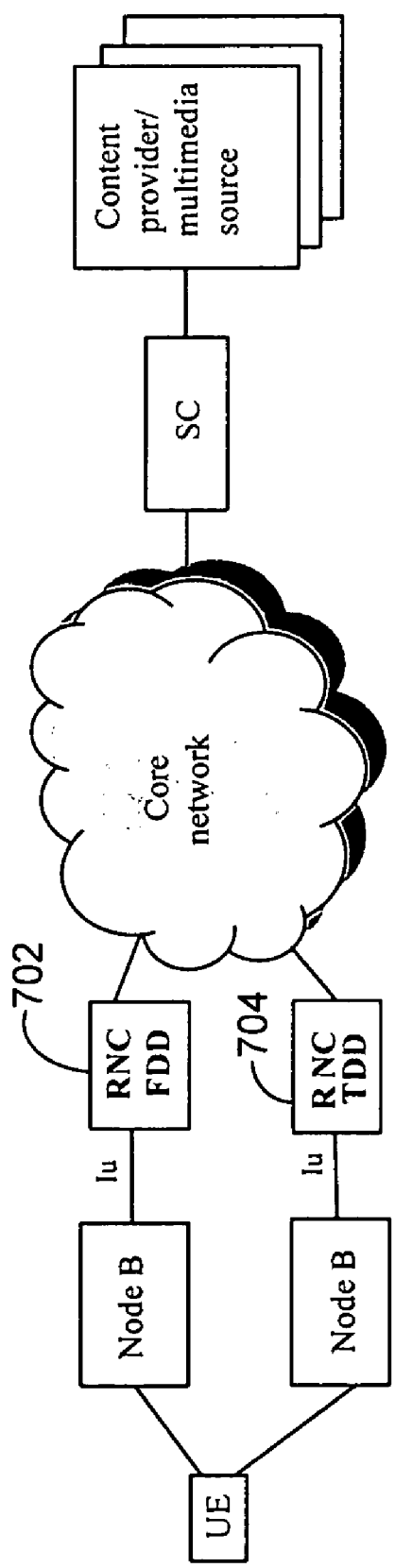
FIG. 7 illustrates an example of a 3GPP network architecture according to embodiments of the invention.

FIG. 7 illustrates an exemplary network architecture of an embodiment of the present invention pursuant to the 3GPP network architecture in which W-DCMA-based FDD and TD-CDMA-based TDD radio access networks 702, 704 are used for the delivery of multimedia. According to this embodiment, Rel.6 TDD and pre-Rel.6 FDD networks are employed. (Rel. 6 refers to Release 6 of the 3GPP standard.) The multimedia service is provided over TDD using a point-to-multipoint (p-t-m) MBMS bearer, while a unicast streaming bearer is used in FDD for multimedia service provisioning.

According to another embodiment, Rel.6 TDD and Rel.6 FDD networks may be employed. The service may be provisioned over TDD using a p-t-m MBMS bearer, and over FDD using a point-to-point (p-t-p) MBMS bearer. According to yet another embodiment, Rel.6 TDD and Rel.6 FDD networks may be employed, while the service is provided over TDD using a p-t-m MBMS bearer and over FDD using a p-t-m MBMS bearer.

The UE receives the data streams over the two radio access networks. After passing through protocol stacks of each of the radio access technologies, the two data streams are sent to the application layer for application layer combining. As a result of the combining procedure, the application layer produces a single decoded multimedia stream from the received multiple input streams.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 8:
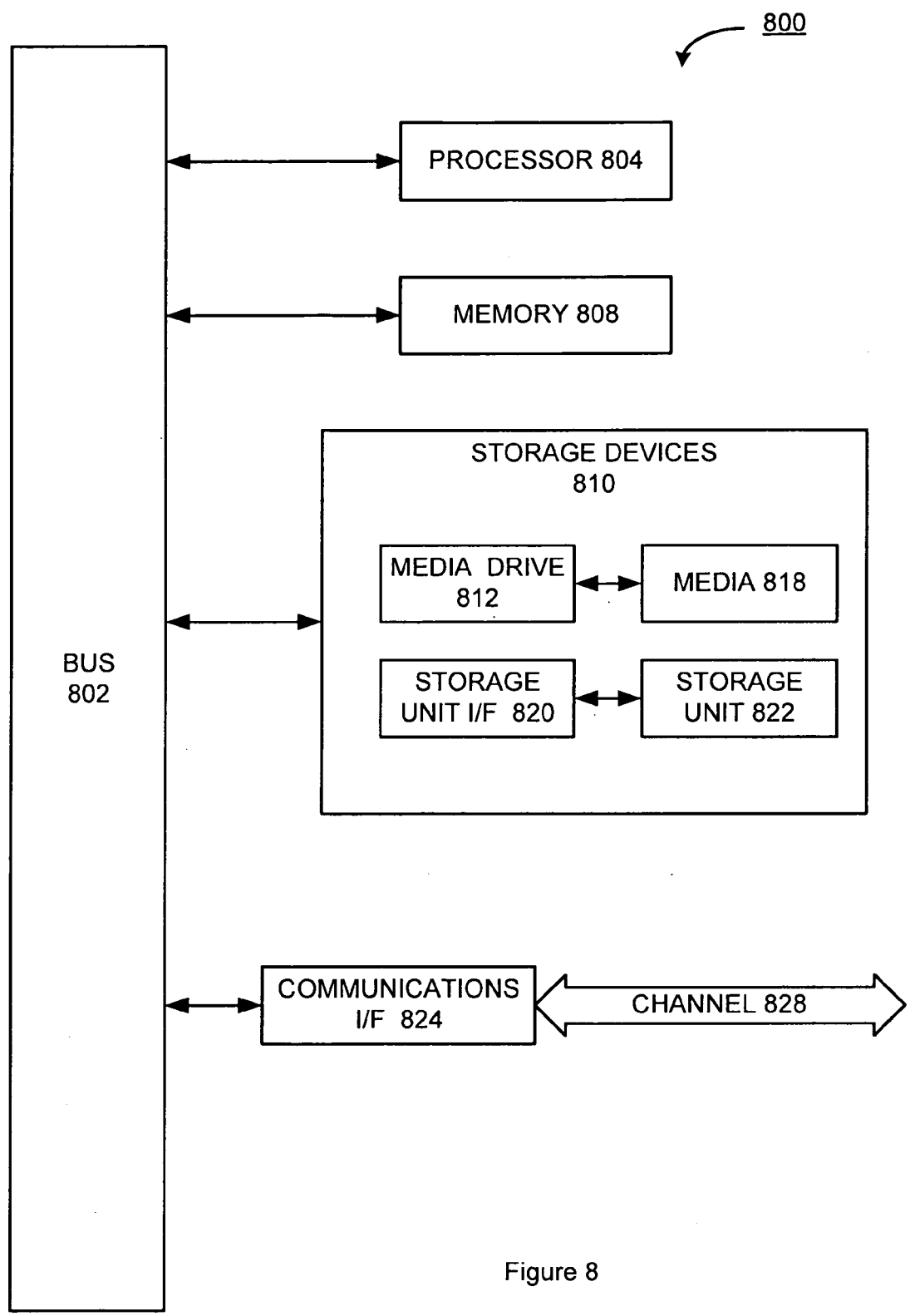
FIG. 8 illustrates a computer system that may be employed to implement embodiments of the invention.

FIG. 8 illustrates a typical computing system 800 that may be employed to implement processing functionality in embodiments of the invention. Computing systems of this type may be used in the SC, the radio controllers, the base stations, and the UEs, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818, may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 822 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as "computer program code" (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, by a removable storage media 818, media drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

All patents, applications, published applications and other publications referred to herein are incorporated by reference herein in their entirety, including the following references:

[1]. 3GPP TS 23.246, "Multimedia/Broadcast Multicast Service (MBMS) User Services; Stage 1", Release 6.

[2]. 3GPP TS 26.345, "Multimedia/Broadcast Multicast Service (MBMS); Protocols and codecs", Release 6.

[3]. 3GPP TS 29.846, "Multimedia/Broadcast Multicast Service (MBMS); CN1 procedures", Release 6.

[4]. 3GPP TS 33.246, "Security of Multimedia Broadcast/Multicast Service", Release 6.

[5]. 3GPP TS 25.346, "Introduction of the Multimedia Broadcast/Multicast Service (MBMS) in the Radio Access Network (RAN); Stage 2", Release 6.

[6]. Internet Group Management Protocol, IGMPv2, http://www.ietf.org/rfc/rfc2236.txt

[7]. "Multicast Listener Discovery (MLD) for IPv6", http://www.ietf.org/rfc/rfc2710.txt

[8]. 3GPP TS 32.240, "Charging management; Charging architecture and principles", Release 6.

[9]. 3GPP TS 24.008, "Mobile radio interface Layer 3 specification; Core network protocols; Stage 3", Release 6.

[10]. 3GPP TS 29.060, "General Packet Radio Service (GPRS);GPRS Tunnelling Protocol (GTP) across the Gn and Gp interface", Release 6.

[11]. 3GPP TS 25.331, "Radio Resource Control (RRC); Protocol specification", Release 6.

What is claimed is:

1. A wireless network comprising:
   circuitry configured to provide first and second data streams in respective first and second transmission modes over respective first and second networks, wherein the first and second data streams carry the same content, and the first and second networks employ respective first and second radio access technologies (RATs) each on a separate frequency band;
   circuitry configured to provide the first and second data streams such that lower layer combining is performed by a user equipment (UE);
   circuitry configured to synchronize the transmission of the first and second data streams over the first and second networks for substantially simultaneous receipt at the UE; and
   circuitry, in the UE, configured to receive and combine in a lower layer the first and second data streams.

2. The wireless network of claim 1, wherein the first and second data streams are part of a multimedia service.

3. The wireless network of claim 1, further comprising:
   circuitry configured to signal to user equipment identifiers for the first and second networks over which the first and second data streams are established.

4. The wireless network of claim 1, wherein the first transmission mode is point-to-multipoint.

5. The wireless network of claim 1, wherein the second transmission mode is unicast.

6. The wireless network of claim 1, wherein the first RAT is time-division duplex (TDD).

7. The wireless network of claim 1, wherein the second RAT is frequency-division duplex (FDD).

8. The wireless network of claim 1, further comprising:
   circuitry configured to insert into the transmission of each data stream information to assist in soft decision decoding.

9. A method performed by a wireless network, the method comprising:
   providing, by the wireless network, first and second data streams in respective first and second transmission modes over respective first and second networks, the first and second data streams for carrying the same content, the first and second networks employing respective first and second radio access technologies (RATs) each on a separate frequency band;
   providing, by the wireless network, the first and second data streams such that lower layer combining is performed by a user equipment;
   synchronizing, by the wireless network, the transmission of the first and second data streams over the first and second networks for substantially simultaneous receipt at the user equipment; and
   receiving and combining, by the UE, in a lower layer the first and second data streams.

10. The method of claim 9, wherein the first and second data streams are part of a multimedia service.

11. The method of claim 9, further comprising:
    signaling, by the wireless network, to user equipment identifiers for the first and second networks over which the first and second data streams are established.

12. The method of claim 9, wherein the first transmission mode is point-to-multipoint.

13. The method of claim 9, wherein the second transmission mode is unicast.

14. The method of claim 9, wherein the first RAT is time-division duplex (TDD).

15. The method of claim 9, wherein the second RAT is frequency-division duplex (FDD).

16. The method of claim 9, further comprising; inserting, by the wireless network, into the transmission of each data stream information to assist in soft decision decoding.

17. A user equipment (UE) comprising:
    circuitry configured to receive first and second data streams in respective first and second transmission modes over respective first and second networks, wherein the first and second data streams carry the same content, and the first and second networks employ respective first and second radio access technologies (RATs) each on a separate frequency band;
    circuitry configured to substantially simultaneously receive the transmission of the first and second data streams over the first and second networks; and
    circuitry configured to combine the first and second data streams in a lower layer.

18. The UE of claim 17, wherein the first and second data streams are part of a multimedia service.

19. The UE of claim 17, further comprising:
    circuitry configured to receive a signal identifying the first and second networks over which the first and second data streams are established.

20. The UE of claim 17, wherein the first transmission mode is point-to-multipoint.

21. The UE of claim 17, wherein the second transmission mode is unicast.

22. The UE of claim 17, wherein the first RAT is time-division duplex (TDD).

23. The UE of claim 17, wherein the second RAT is frequency-division duplex (FDD).

24. The UE of claim 17, further comprising:
    circuitry configured to receive, in the transmission of each data stream, information to assist in soft decision decoding.

25. A method performed by a user equipment (UE), the method comprising:
    receiving, by the UE, first and second data streams in respective first and second transmission modes over respective first and second networks, the first and second data streams for carrying the same content, the first and second networks employing respective first and second radio access technologies (RATs) each on a separate frequency band;
    receiving substantially simultaneously, by the UE, the transmission of the first and second data streams over the first and second networks; and
    combining the first and second data streams in a lower layer.

26. The method of claim 25, wherein the first and second data streams are part of a multimedia service.

27. The method of claim 25, further comprising:
receiving, by the UE, a signal identifying the first and second networks over which the first and second data streams are established.

28. The method of claim 25, wherein the first transmission mode is point-to-multipoint.

29. The method of claim 25, wherein the second transmission mode is unicast.

30. The method of claim 25, wherein the first RAT is time-division duplex (TDD).

31. The method of claim 25, wherein the second RAT is frequency-division duplex (FDD).

32. The method of claim 25, further comprising:
receiving, by the UE in the transmission of each data stream, information to assist in soft decision decoding.

33. The wireless network of claim 1 wherein the circuitry configured to provide the first and second data streams, the circuitry configured to provide the first and second data streams such that lower layer combining, or the circuitry configured to synchronize is included in at least one of a base station or controller.

34. The wireless network of claim 9 wherein providing the first and second data streams, providing the first and second data streams such that lower layer combining, or the circuitry configured to synchronize is included in at least one of a base station or controller.

* * * * *